(12) United States Patent
Kaneko

(10) Patent No.: US 7,552,651 B2
(45) Date of Patent: Jun. 30, 2009

(54) ELECTROMAGNETIC FLOWMETER HAVING A LINING MEMBER LOCKED IN THE VICINITY OF THE CORE

(75) Inventor: Yuichi Kaneko, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 28 days.

(21) Appl. No.: 11/487,181

(22) Filed: Jul. 13, 2006

(65) Prior Publication Data

US 2007/0017302 A1 Jan. 25, 2007

(30) Foreign Application Priority Data

Jul. 15, 2005 (JP) ............... P.2005-206359
Feb. 1, 2006 (JP) ............... P.2006-024341

(51) Int. Cl.
*G01F 1/58* (2006.01)
(52) U.S. Cl. .................................. 73/861.12
(58) Field of Classification Search ............... 73/861.12
See application file for complete search history.

(56) References Cited

U.S. PATENT DOCUMENTS

| 3,813,938 | A | * | 6/1974 | Grosch et al. ............. 73/861.12 |
| 4,253,340 | A | * | 3/1981 | Schmoock ............... 73/861.12 |
| 4,279,166 | A | * | 7/1981 | Gryn et al. ............... 73/861.12 |
| 4,329,879 | A | * | 5/1982 | Appel et al. .............. 73/861.12 |
| 5,280,727 | A | * | 1/1994 | Hafner et al. ............. 73/861.12 |
| 5,458,003 | A | * | 10/1995 | Ishihara et al. ............ 73/861.12 |
| 5,747,697 | A | * | 5/1998 | Johnson et al. .............. 73/760 |
| 5,773,723 | A | * | 6/1998 | Lewis et al. ............... 73/861.12 |
| 5,955,681 | A | * | 9/1999 | Hafner et al. ............. 73/861.17 |
| 6,578,432 | B2 | * | 6/2003 | Blakesley et al. ............. 73/826 |
| 6,595,069 | B2 | * | 7/2003 | Frey et al. ................ 73/861.11 |
| 6,658,720 | B1 | * | 12/2003 | Frey et al. ................ 73/861.11 |
| 6,817,249 | B2 | * | 11/2004 | Yamazaki ................ 73/861.12 |
| 6,843,136 | B2 | * | 1/2005 | Hofmann et al. ......... 73/861.12 |
| 6,990,726 | B2 | * | 1/2006 | Frey et al. ................ 73/861.11 |
| 2002/0033054 | A1 | * | 3/2002 | Frey et al. ................ 73/861.12 |
| 2004/0149046 | A1 | | 8/2004 | Yamazaki |

FOREIGN PATENT DOCUMENTS

| EP | 1039269 | | 9/2000 |
| GB | 2068122 | | 8/1981 |
| JP | 57088321 | | 6/1982 |
| JP | 2000046605 | A * | 2/2000 |
| JP | 2002-48612 | | 2/2002 |
| JP | 2004-294176 | | 10/2004 |
| JP | 2004-354279 | | 12/2004 |

OTHER PUBLICATIONS

Japanese Application JP-2000046605 Publication in English, Feb. 18, 2000.*
European Search Report re: EP 06 01 4757 mailed Nov. 7, 2008.

* cited by examiner

*Primary Examiner*—Harshad Patel
(74) *Attorney, Agent, or Firm*—John J. Penny, Jr.; Catherine J. Toppin

(57) ABSTRACT

An electromagnetic flowmeter includes: a measurement pipe to which a magnetic pole core is fixed while having a gap between a tip end portion of the magnetic pole core and the measurement pipe; a lining member for covering an inner wall surface of the measurement pipe and the gap; and a locking portion for locking the lining member, the locking portion being provided in a vicinity of the gap.

4 Claims, 16 Drawing Sheets

ELECTROMAGNETIC FLOWMETER HAVING A LINING MEMBER LOCKED IN THE VICINITY OF THE CORE

This application claims foreign priorities based on Japanese Patent Application No. 2005-206359, filed Jul. 15, 2005, and Japanese Patent Application No. 2006-024341, filed Feb. 1, 2006, the contents of which are incorporated herein by reference in their entireties.

BACKGROUND OF THE INVENTION

1. Field of the Invention

The present invention relates to an electromagnetic flowmeter that includes a measurement pipe wherein a magnetic pole core is arranged and a lining member that covers the inner wall face of the measurement pipe, and relates particularly to an electromagnetic flowmeter that can effectively lock the lining member.

2. Description of the Related Art

FIG. 13 is a vertical cross sectional view of the structure of a measurement pipe for an electromagnetic flowmeter having a small diameter in a first related art. FIG. 14 is a transverse, cross sectional view of the measurement pipe in FIG. 13.

In FIGS. 13 and 14, a cylindrical measurement pipe 2 made of stainless steel (for example) has flange portions 1A and 1B at each end respectively, and centrally formed insertion holes 3A and 3B. Magnetic pole cores 4A and 4B having cylindrical shapes, for example, are inserted into the insertion holes 3A and 3B and are securely welded to outer ends 5A and 5B of the insertion holes 3A and 3B.

The magnetic pole cores 4A and 4B are disposed so that gaps 6A and 6B are formed near their distal ends when they are inserted into the insertion holes 3A and 3B in the measurement pipe 2, while distal ends 7A and 7B are maintained at like positions relative to an inner wall face 8 of the measurement pipe 2.

A lining composed, for example, of a fluoroplastic is applied to the inner wall face-8 of the measurement pipe 2, the inner distal faces of the magnetic pole cores 4A and 4B, and the gaps 6A and 6B to provide a lining member 9.

Further, insertion holes 10A and 10B, into which detection electrodes (not shown) are to be inserted, are formed on a line that connects the magnetic pole cores 4A and 4B and in a direction perpendicular to the center line of the measurement pipe 2.

Further, cylindrical electrode attachment portions 11A and 11B for fixing the detection electrodes, are securely welded to the outer wall of the center portion of the measurement pipe 2 perpendicular to the magnetic pole cores 4A and 4B.

FIG. 15 is a vertical, cross sectional view of the structure of the measurement pipe of an electromagnetic flowmeter having a small diameter in a second related art. FIG. 16 is a transverse cross sectional view of the measurement pipe in FIG. 15.

In FIGS. 15 and 16, a measurement pipe 12 made of stainless steel, for example, is a cylindrical spool pipe that has flange portions 11A and 11B at its two ends and centrally formed insertion holes 13A and 13B. Magnetic pole cores 14A and 14B having cylindrical shapes, for example, are inserted into the insertion holes 13A and 13B and are securely welded to outer ends 15A and 15B of the insertion holes 13A and 13B.

When the magnetic pole cores 14A and 14B are inserted into the insertion holes 13A and 13B in the measurement pipe 12, distal ends 17A and 17B are maintained in the same plane as an inner wall face 18 of the measurement pipe 12.

Coil bobbins 113A and 113B, around which coils 114A and 114B are wound, are fitted over the magnetic pole cores 14A and 14B.

A lining made, for example, of a fluoroplastic is applied to the inner wall face 18 of the measurement pipe 12 and the distal ends 17A and 17B of the magnetic pole cores 14A and 14B, so as to provide a lining member 19.

Further, insertion holes 110A and 110B, into which detection electrodes (not shown) are to be inserted, are formed on a line that connects the magnetic pole cores 14A and 14B and in a direction perpendicular to the center line of the measurement pipe 12.

Furthermore, cylindrical electrode attachment portions 111A and 111B, for fixing the detection electrodes, are securely welded to the outer wall of the center portion of the measurement pipe 12 perpendicular to the magnetic pole cores 14A and 14B.

First and second electrodes 112A and 112B are located next to the electrode attachment portions 111A and 111B, so that their electrodes are exposed through the lining member 19 and face the interior of the measurement pipe 12.

A first signal line 118A, extending from the first electrode 112A, is passed through the magnetic pole core 14B and is twisted together with a second signal line 118B on the second electrode 112B side. In order to twist the first signal line 118A and the second signal line 118B within the shortest distance possible, this structure is designed so that only the first signal line 118A is passed through the magnetic pole core 14B.

Disclosed in JP-A-2004-354279 is a technique whereby in order to prevent deformation of the lining, a groove is formed in the inner wall near the end face of a measurement pipe separate from the center of a measurement pipe, and a lining member is locked by the groove.

Disclosed in JP-A-2002-048612 is a technique whereby, in order to prevent deformation of the lining, a cylindrical locking plate wherein multiple holes are formed is arranged inside a lining member to lock the lining member.

Also, refer to JP-A-2004-294176.

However, the following problems are encountered with the first related small-diameter electromagnetic flowmeter shown in FIGS. 13 and 14.

Since the lining member 9 provided for the inner wall of the stainless steel measurement pipe 2 is formed of a fluoroplastic, the lining member 9 is not secured to the measurement pipe 2. However, since the lining member 9 is also deposited in the gaps 6A and 6B surrounding the magnetic pole cores 4A and 4B, movement of the measurement pipe 2 in the axial direction due to changes in the temperature is limited, but the measurement pipe 2 can still be moved in the radial direction. Therefore, using this structure, adequate locking effects are not obtained that can prevent deformations of the lining member 9 in the radial direction that are due to temperature fluctuations and pressure changes.

Therefore, for a measurement pipe having a small diameter of 15 mm or less, the ratio of deformations in the lining member 9 caused by temperature or pressure changes relative to the internal diameter is increased, and errors increase. Especially, deformation of the lining member 9 near the detection electrodes provides a great effect because the rate at which electromotive force is conducted to the detection electrodes is increased.

In order to prevent deformation of the lining member, in JP A-2004-354279, a structure is disclosed wherein a groove is formed in the inner wall of the measurement pipe near the end face to lock the lining member. However, with this structure, the lining near the detection electrodes that greatly influences measurement accuracy can not be secured.

Furthermore, for the second related small-diameter electromagnetic flowmeter shown in FIGS. 15 and 16, since the internal diameter of the spool pipe (the measurement pipe) is small, the insertion of a lining locking punch plate is difficult. Therefore, the internal lining diameter tends to change as the temperature of a fluid fluctuates, and the measurement accuracy is greatly affected by the change in the temperature of the fluid.

In addition, a rise in magnetic flux density is slowed due to an eddy current that is generated at a magnetic pole and affects the frequency property of the magnetic circuit. Further, since the first signal line penetrates a magnetic pole core, differential noise equivalent to a linkage dimension is generated only along the first signal line. When differential noise in the magnetic pole core is converged slowly and converging of the differential noise is still not satisfactory during signal sampling, differential noise is retained in the first signal. Further, since there is a difference in the amount of noise between the first and the second signals, the shifting distance at the zero point may be increased.

In JP-A-2002-048612, a structure is disclosed wherein the cylindrical locking plate, in which multiple holes are formed, is inserted inside the lining member. For this structure, however, there is no space in the small-diameter electromagnetic flowmeter for the insertion of a cylindrical locking plate, and this structure can not be provided for a small-diameter electromagnetic flowmeter.

SUMMARY OF THE INVENTION

The present invention has been made in view of the above circumstances, and provides an electromagnetic flowmeter having a small diameter for which a lining member, located near detection electrodes and has a high rate of conduction of an electromotive force, can be effectively locked without having to insert a cylindrical locking plate, which is a difficult task when a small-diameter electromagnetic flowmeter is employed.

Another objective of the invention is to provide a structure that reduces an affect produced by an eddy current that is generated inside a magnetic pole, that improves the frequency, and that reduces the affect differential noise has on a first signal line.

In some implementations, an electromagnetic flowmeter of the invention comprising:

a measurement pipe to which a magnetic pole core is fixed while having a gap between a tip end portion of the magnetic pole core and the measurement pipe;

a lining member for covering an inner wall surface of the measurement pipe and the gap; and a locking portion for locking the lining member, the locking portion being provided in a vicinity of the gap.

In the electromagnetic flowmeter of the invention, the locking portion includes an outer end portion of an insertion hole in the measurement pipe to which the magnetic pole core is inserted, the outer end portion being formed in a shape (tapered-shape) that extends in a direction outward from the magnetic pole core.

In the electromagnetic flowmeter of the invention, the locking portion includes an outer end portion of an insertion hole in the measurement pipe to which the magnetic pole core is inserted, the outer end portion being extended in a direction outward from the magnetic pole core and being formed of a groove (dovetail groove) that cuts into an inner wall side of the measurement pipe.

In the electromagnetic flowmeter of the invention, the locking portion further includes a groove (dovetail groove) which is formed in the magnetic pole core so as to narrow a part of the magnetic pole core, the groove being formed in a shape (tapered-shape) that extends towards an inner side of the magnetic pole core, and being opposed to the outer end portion of the insertion hole.

In the electromagnetic flowmeter of the invention, the locking portion includes a through-hole opening to either side faces of the magnetic pole core, the side faces being adjacent to the gap around the magnetic pole core.

In some implementations, an electromagnetic flowmeter of the invention comprising:

a measurement pipe to which a magnetic pole core is fixed;

a lining member for covering an inner wall surface of the measurement pipe; and a locking portion for locking the lining member, the locking portion being formed by providing a through-hole inside the magnetic pole core along an axis of the magnetic pole core so that the through-hole connects with the lining member, and filling the through-hole with a lining resin of a same type as that of the lining member.

In the electromagnetic flowmeter of the invention, the through-hole is provided in a central position of the magnetic pole.

In the electromagnetic flowmeter of the invention, the locking portion includes a step that is formed in the through-hole.

In the electromagnetic flowmeter of the invention, the step in the through-hole is formed so that a diameter of one end portion of the through-hole on the lining member side is smaller than that of the other part of the through-hole.

In the electromagnetic flowmeter of the invention, apart of the through-hole on the lining member side is filled with the lining resin and the other part of the through-hole is filled with a mixture of an insulating resin and a soft magnetic metal powder.

In the electromagnetic flowmeter of the invention, the through-hole is filled with the lining resin at least to a position where the step is formed.

In some implementations, an electromagnetic flowmeter of the invention comprising:

a measurement pipe;

a pair of magnetic pole cores which are disposed in a direction perpendicular to an axial direction of the measurement pipe and are opposed to each other;

a pair of detection electrodes which are disposed in a direction perpendicular to the pair of magnetic pole cores and are opposed to each other, with each pole of the pair of detection electrodes facing an interior of the measurement pipe;

a lining member that covers an inner wall surface of the measurement pipe;

a locking portion for locking the lining member;

a first signal line extending from one of the detection electrodes; and a second signal line extending from the other detection electrode, wherein the first signal line passes through one of the magnetic pole cores so as to make bundles of the first signal line and the second signal line.

In the electromagnetic flowmeter of the invention, the locking portion is formed by providing a through-hole inside each of the magnetic pole cores along an axis of the magnetic pole core so that the through-hole connects with the lining member, and filling the through-hole with a lining resin of a same type as that of the lining member.

In the electromagnetic flowmeter of the invention, the through-hole is provided in a central position of the magnetic pole.

In the electromagnetic flowmeter of the invention, the locking portion includes a step that is formed in the through-hole.

In the electromagnetic flowmeter of the invention, the step in the through-hole is formed so that a diameter of one end portion of the through-hole on the lining member side is smaller than that of the other part of the through-hole.

In the electromagnetic flowmeter of the invention, a part of the through-hole on the lining member side is filled with the lining resin and the other part of the through-hole is filled with a mixture of an insulating resin and a soft magnetic metal powder.

In the electromagnetic flowmeter of the invention, the through-hole is filled with the lining resin at least to a position where the step is formed.

According to the electromagnetic flowmeter of the invention described above, the following effects can be obtained.

According to the invention, the locking portion for locking the lining member is provided near each of the gaps around the magnetic pole cores, and the gaps are located near the detection electrodes that have a great affect on electromotive force. The lining member can be effectively held in both the axial direction and in the radial direction of the measurement pipe. Thus, a small-diameter electromagnetic flowmeter can be provided that is little affected by temperature changes or fluid conditions under pressure.

Further, according to the invention, the insertion holes in the measurement pipe into which the magnetic pole cores are inserted are provided as tapered portions that spread outward, and serve as locking portions. Thus, since the lining member enters these tapered portions, movement of the lining member in the radial direction of the measurement pipe can be prevented.

Furthermore, according to the invention, the outer ends of the insertion holes in the measurement pipe into which the magnetic pole cores are inserted extend outward, so that the locking portions are formed in and engage dovetailed grooves that are cut into the inner wall of the measurement pipe. Thus, the lining member engages more deeply with these dovetailed grooves, and movement of the lining member can more effectively be prevented.

In addition, according to the invention, the outer ends of the insertion holes in the measurement pipe into which the magnetic pole cores are inserted are provided as tapered portions that spread outward. In the magnetic pole cores, tapered portions are formed that narrow inwardly that are opposite of the outward spreading tapered outer ends. Thus, these taperedportions form V-shaped, dovetailed grooves to provide locking portions. Therefore, the lining member can be effectively held in the radial direction of the measurement pipe.

Moreover, according to the invention, through holes are formed in the side faces of the magnetic pole cores that face the gaps surrounding the magnetic pole cores, and these also serve as locking portions. Therefore, through the bridge locking effects provided by the lining member material that is used to fill in the through holes, excellent effects can be obtained that prevent the lining member from being deformed in the radial direction of the measurement pipe.

Also according to the invention, the locking portion communicates with the through holes formed in the magnetic pole cores, and the same type of lining resin as is used for the lining member is used to fill in the through holes. Thus, the locking effects can be obtained that are provided by the lining resin, and the affect on the measurement accuracy caused by changes in the fluid temperature can be reduced.

Further, according to the invention, since the through holes are centrally formed at positions along the axes of the magnetic pole cores, the lining member can be appropriately bonded to the lining resin used to fill in the through holes. Satisfactory locking effects can thus be obtained.

Furthermore, according to the invention, since the resin locking section for locking the lining resin is formed by filling in the through holes, the lining resin bonded to the lining member is stably held in the through holes.

In addition, according to the invention, since steps are formed in the through holes as resin locking portions, the lining resin can be held by the steps. The state in which the lining member is held (locked) is in a more stable state.

Moreover, according to the invention, since the steps are formed so that the diameters of the holes close to the lining member are small, the lining resin can be held in consonance with the downsizing of the diameter. Therefore, the state in which the lining member is held can be more stable.

Also, according to the invention, the lining resin is used to fill in part of each of the through holes, and the insulating resin with which the soft magnetic powder is mixed is used to fill in the remainder of each of the through holes. Since the affect produced by an eddy current generated inside a magnetic pole core is reduced in this manner, the frequency property of the magnetic circuit is improved, and the affect of differential noise on a signal line can be reduced.

Further, according to the invention, the lining resin is used to fill in at least to the position of the step formed in each of the through holes. Thus, the amount of lining resin used for filling in can be minimized, and instead, more insulating resin into which soft magnetic powder has been mixed can be used for filling. Accordingly, the affect produced by an eddy current generated inside a magnetic pole core is reduced, so that the frequency property of the magnetic circuit can be improved and the effect of differential noise on a signal line can be reduced.

Furthermore, according to the invention, the electromagnetic flowmeter comprises:

a measurement pipe;

a pair of magnetic pole cores which are disposed in a direction perpendicular to an axial direction of the measurement pipe and are opposed to each other;

a pair of detection electrodes which are disposed in a direction perpendicular to the pair of magnetic pole cores and are opposed to each other, with each pole of the pair of detection electrodes facing an interior of the measurement pipe;

a lining member that covers an inner wall surface of the measurement pipe;

a locking portion for locking-the lining member;

a first signal line extending from one of the detection electrodes; and a second signal line extending from the other detection electrode, wherein the first signal line passes through one of the magnetic pole cores so as to make bundles of the first signal line and the second signal line.

With this structure, effective holding of the lining resin can be obtained, and the affect on the measurement accuracy of changes in the fluid temperature can be reduced.

Also according to the invention, the lining locking portion communicates with the through holes formed in the magnetic pole cores, and the same type of lining resin as is used for the lining member is used to fill in the through holes. Thus, the locking effects can be obtained that are provided by the lining resin, and the affect on the measurement accuracy of changes in the fluid temperature can be reduced.

Further, according to the invention, since the through holes are centrally formed at positions along the axes of the magnetic pole cores, the lining member can be appropriately bonded to the lining resin used to fill in the through holes. Thus, satisfactory locking effects can be obtained.

Furthermore, according to the invention, since the resin locking portion for locking the lining resin is formed by filling in the through holes, the lining resin bonded to the lining member is stably held in the through holes.

In addition, according to the invention, since steps are formed in the through holes as resin locking portion, the lining resin can be held by the steps. Thus the state in which the lining member is held in a more stable state.

Moreover, according to the invention, since the steps are formed so that the diameters of the holes close to the lining member are small, the lining resin can be held in consonance with the downsizing of the diameter. Therefore, the state in which the lining member is held can be more stable.

Also, according to the invention, the lining resin is used to fill in part of each of the through holes, and the insulating resin with which the soft magnetic powder is mixed is used to fill in the remainder of each of the through holes. Since the affect produced by an eddy current generated inside a magnetic pole core is reduced in this manner, the frequency property of the magnetic circuit is improved, and the affect of differential noise on a signal line can be reduced.

Further, according to the invention, the lining resin is used to fill in at least to the position of the step formed in each of the through holes. Thus, the amount of lining resin used for filling in can be minimized, and instead, more insulating resin into which soft magnetic powder has been mixed can be used for filling. Accordingly, the affect produced by an eddy current generated inside a magnetic pole core is reduced, so that the frequency property of the magnetic circuit can be improved and the effect of differential noise on a signal line can be reduced.

DETAILED DESCRIPTION OF THE PREFERRED EMBODIMENTS

The preferred embodiments of the present invention will now be described in detail while referring to the accompanying drawings.

First Embodiment

Figure 1A:
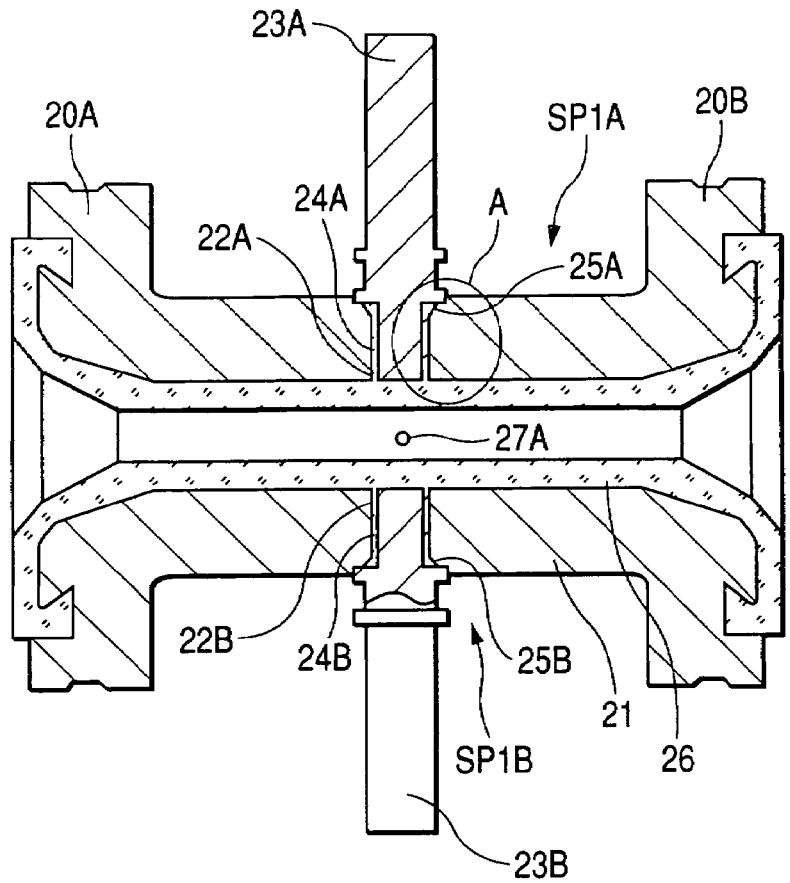
FIG. 1A is a vertical, cross-sectional view of the structure of the essential portion of a measurement pipe according to a first embodiment of the present invention.
Figure 1B:
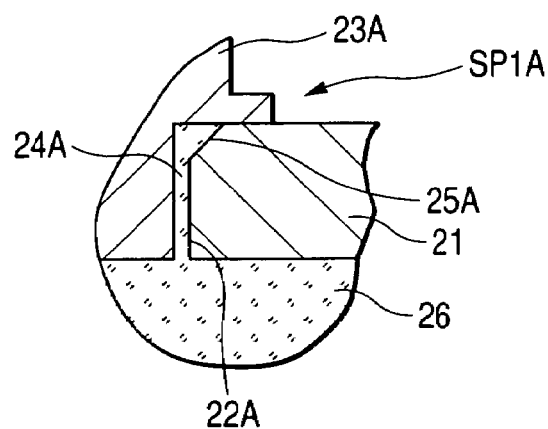
FIG. 1B is a detailed diagram showing a portion A in FIG. 1A.
Figure 2:
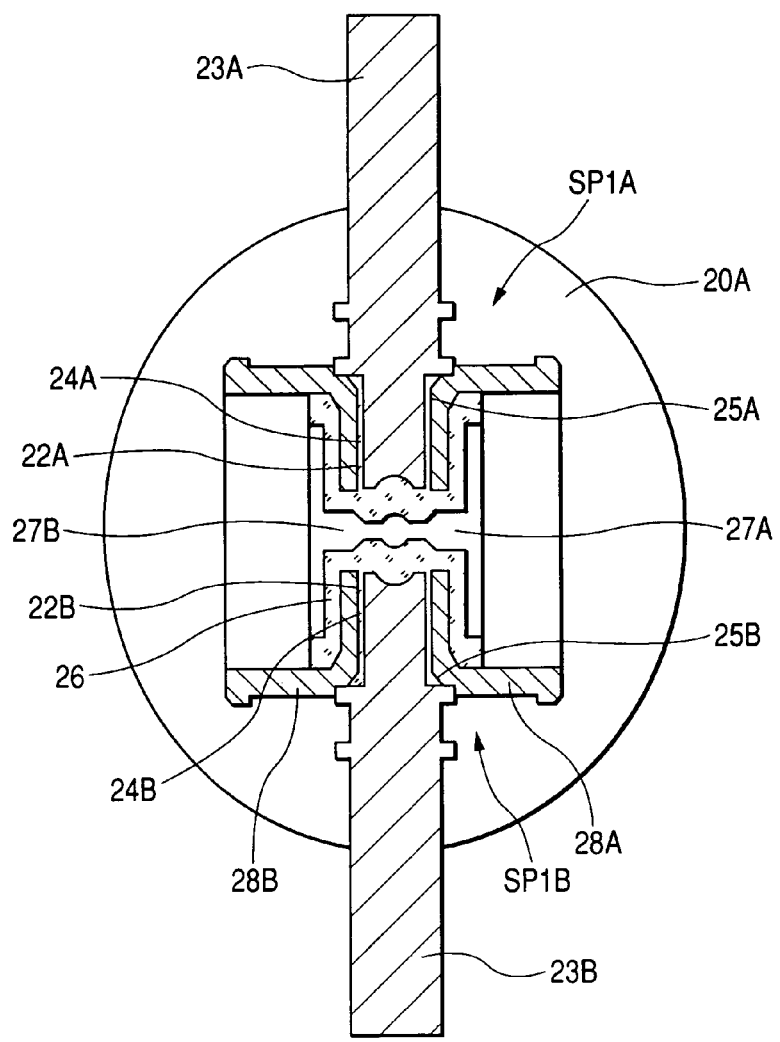
FIG. 2 is a transverse, cross-sectional view of the center portion of the measurement pipe shown in FIG. 1A.

FIG. 1A is a vertical cross-sectional view of the structure of the essential portion of a measurement pipe according to a first embodiment of the invention. FIG. 1B is a detailed diagram showing a portion A in FIG. 1A. FIG. 2 is a transverse, cross-sectional view of the center portion of the measurement pipe in FIGS. 1A and 1B.

In FIGS. 1A, 1B and 2, flange portions 20A and 20B are formed at the respective ends of a cylindrical measurement pipe 21 made, for example, of stainless steel. Insertion holes 22A and 22B are formed opposite each other, in the center portion of the pipe shaft of the measurement pipe 21.

While predetermined gaps 24A and 24B are maintained relative to the insertion holes 22A and 22B, magnetic pole cores 23A and 23B which have (for example) a cylindrical shape are inserted into the insertion holes 22A and 22B and are securely welded to the outer ends of the insertion holes 22A and 22B.

These outer ends are formed so that the insertion holes 22A and 22B are tapered and spread outward, and tapered portions 25A and 25B serve as stoppers SP1A and SP1B for locking a lining member.

A lining member 26 made of a fluoroplastic is deposited by lining, on the inner wall of the measurement pipe 21, the distal ends of the magnetic pole cores 23A and 23B and inside the gaps 24A and 24B and the tapered portions 25A and 25B.

In order to provide the lining member 26 inside the gaps 24A and 24B and the tapered portions 25A and 25B, resin molding need only be performed by applying a fluoroplastic, together with the formation of the internal diameter.

Further, in a direction perpendicular to the center line that connects the centers of the magnetic pole cores 23A and 23B, insertion holes 27A and 27B, used to insert detection electrodes (not shown), are formed through the lining member 26.

Further, cylindrical electrode attachment portions 28A and 28B for fixing the detection electrodes are welded to the outer wall in the center portion of the measurement pipe 21, perpendicular to the magnetic pole cores 23A and 23B.

Second Embodiment

Figure 3A:
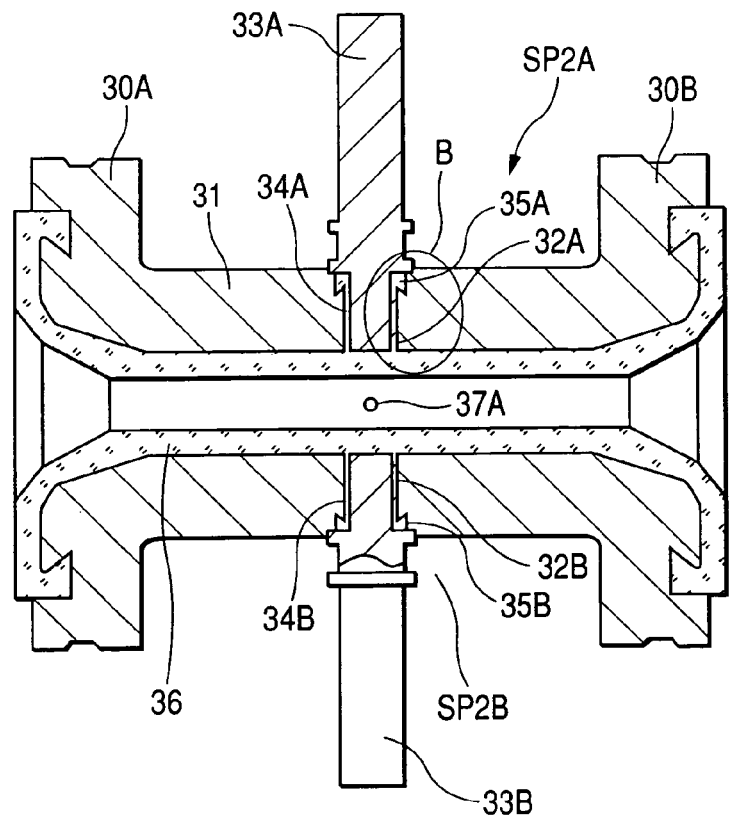
FIG. 3A is a vertical, cross-sectional view of the structure of the essential portion of a measurement pipe according to a second embodiment of the present invention.
Figure 3B:
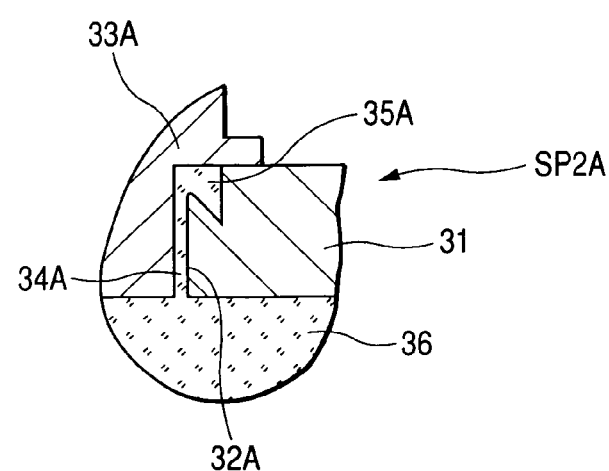
FIG. 3B is a detailed diagram showing a portion B in FIG. 3A.
Figure 4:
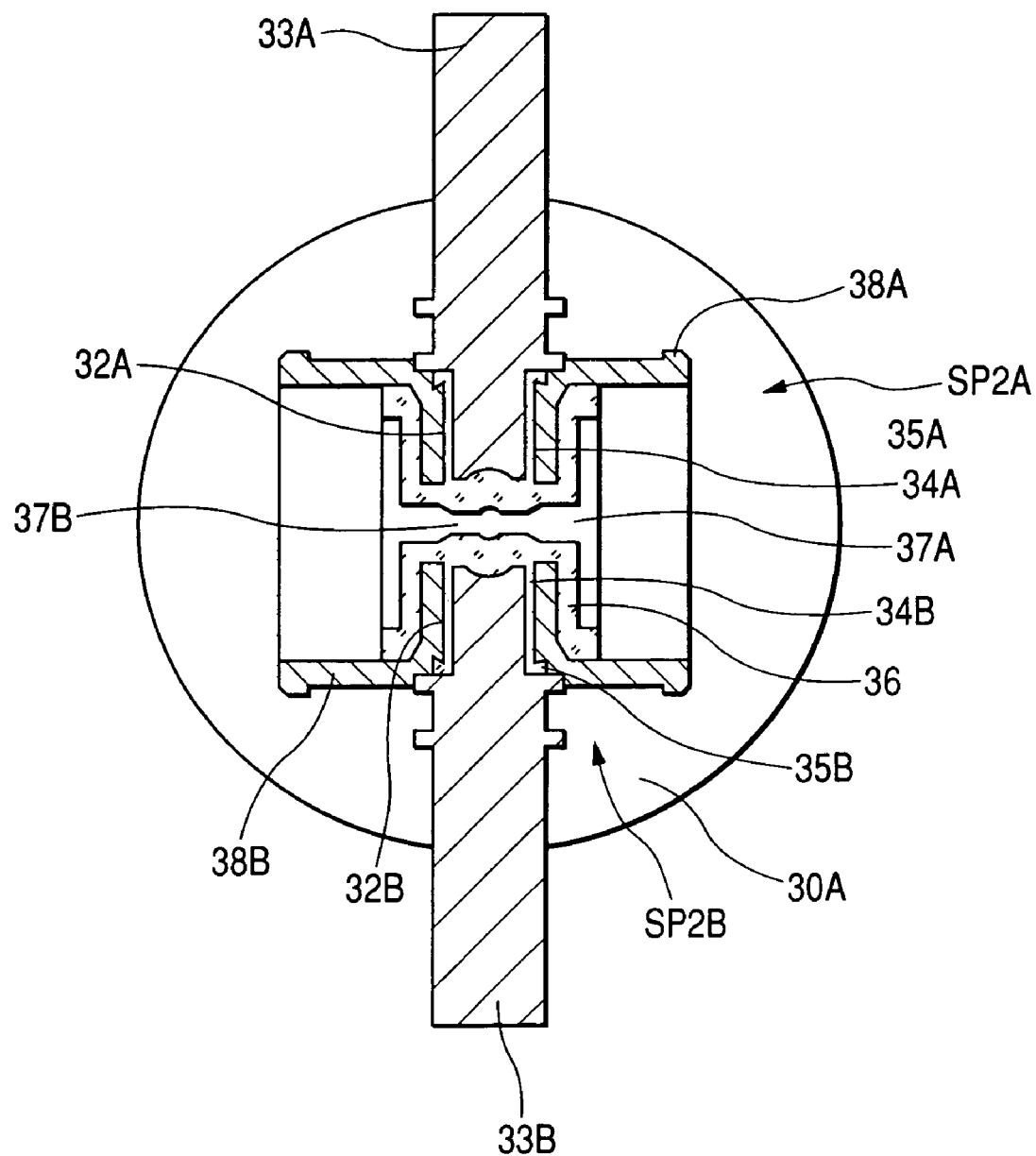
FIG. 4 is a transverse, cross-sectional view of the center portion of the measurement pipe shown in FIG. 3A.

FIG. 3A is a vertical cross-sectional view of the structure of the essential portion of a measurement pipe according to a second embodiment of the invention. FIG. 3B is a detailed diagram showing a portion B in FIG. 3A. FIG. 4 is a transverse, cross-sectional view of the center portion of the measurement pipe in FIGS. 3A and 3B.

In FIGS. 3A, 3B and 4, flange portions 30A and 30B are formed at the respective ends of a cylindrical measurement pipe 31 made, for example, of stainless steel. Insertion holes 32A and 32B are formed opposite each other in the center portion of the pipe shaft of the measurement pipe 31.

While predetermined gaps 34A and 34B are maintained relative to the insertion holes 32A and 32B, magnetic pole cores 33A and 33B, which have, for example, a cylindrical shape, are inserted into the insertion holes 32A and 32B and are securely welded to the outer ends of the insertion holes 32A and 32B.

The outer ends of the insertion holes 32A and 32B of the measurement pipe 31 into which the magnetic pole cores 33A and 33B are inserted extended outwards, and cut into the inner wall of the measurement pipe 31. As a result, these outer ends are formed like dovetailed grooves 35A and 35B, and have substantially N shapes in cross section, in the axial direction of the insertion holes 32A and 32B. In this manner, stoppers SP2A and SP2B are provided.

A lining member 36 made of a fluoroplastic is deposited by lining, on the inner wall of the measurement pipe 31, the distal ends of the magnetic pole cores 33A and 33B and inside the gaps 34A and 34B and the dovetailed grooves 35A and 35B.

In order to provide the lining member 36 inside the gaps 34A and 34B and the dovetailed grooves 35A and 35B, resin molding need only be performed by applying a fluoroplastic, together with the formation of the internal diameter.

Further, in a direction perpendicular to the center line that connects the centers of the magnetic pole cores 33A and 33B, insertion holes 37A and 37B used to insert detection electrodes (not shown) are formed through the lining member 36.

Further, cylindrical electrode attachment portions 38A and 38B for fixing the detection electrodes are welded to the outer wall in the center portion of the measurement pipe 31, perpendicular to the magnetic pole cores 33A and 33B.

Third Embodiment

Figure 5A:
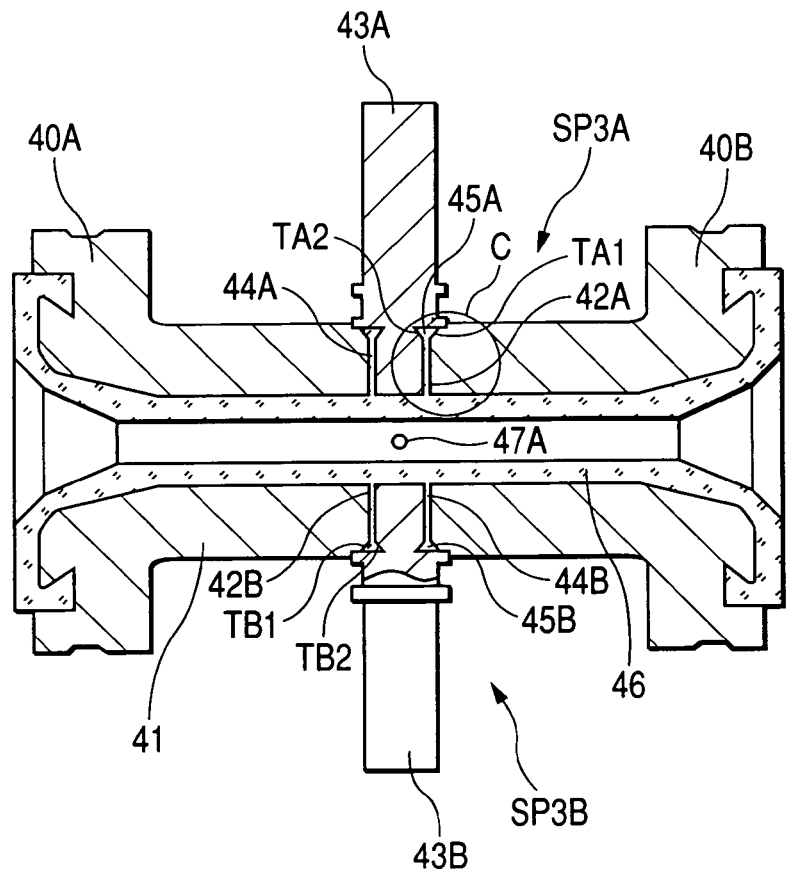
FIG. 5A is a vertical, cross-sectional view of the structure of the essential portion of a measurement pipe according to a third embodiment of the present invention.
Figure 5B:
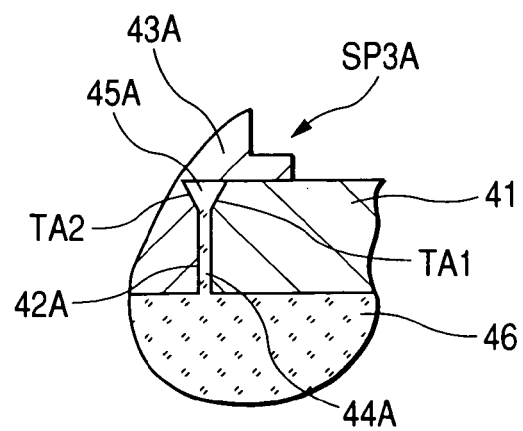
FIG. 5B is a detailed diagram showing a portion C in FIG. 5A.
Figure 6:
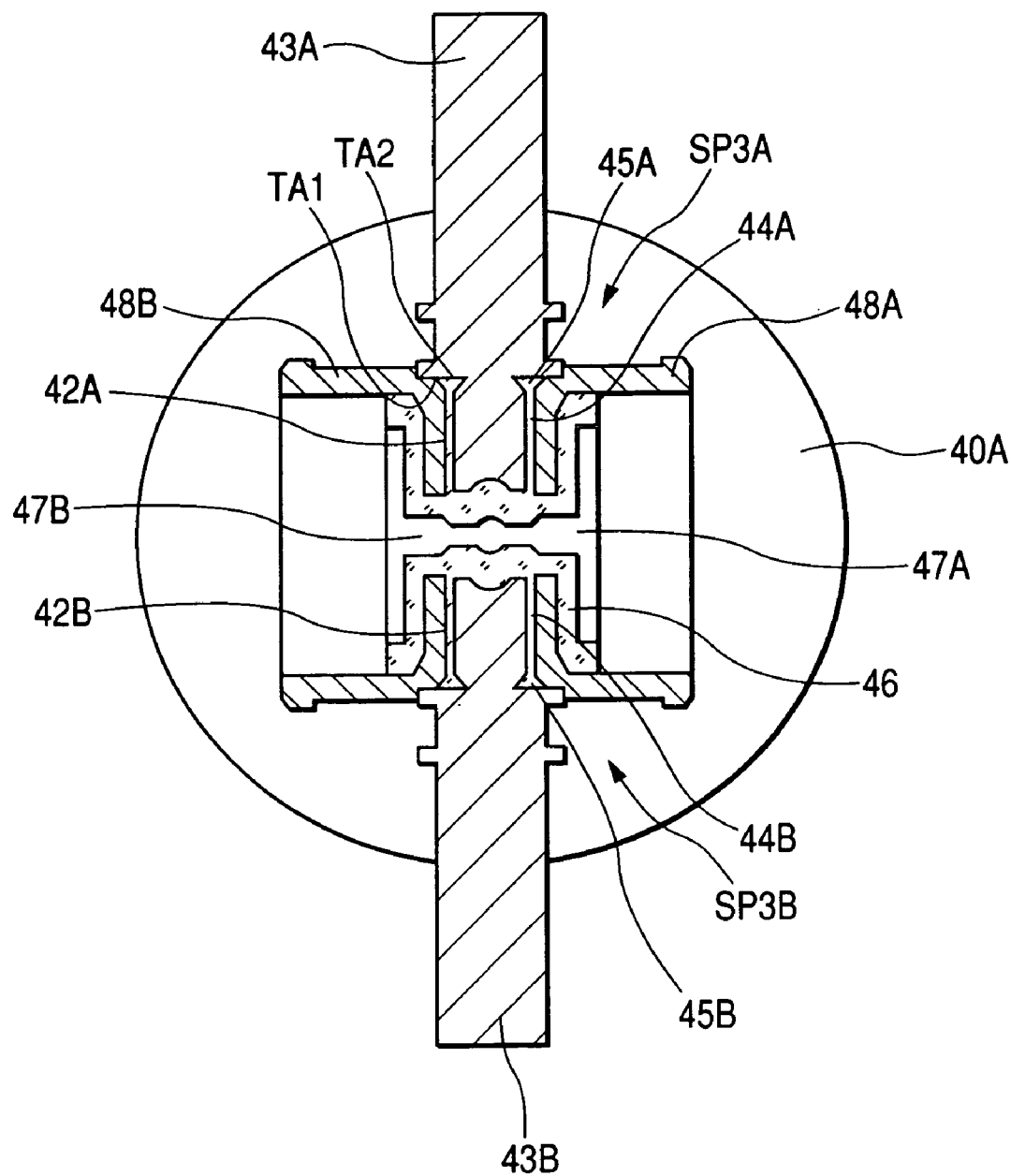
FIG. 6 is a transverse, cross-sectional view of the center portion of the measurement pipe shown in FIG. 5A.

FIG. 5A is a vertical cross-sectional view of the structure of the essential portion of a measurement pipe according to a third embodiment of the invention. FIG. 5B is a detailed diagram showing a portion C in FIG. 5A. FIG. 6 is a transverse, cross-sectional view of the center portion of the measurement pipe in FIGS. 5A and 5B.

In FIGS. 5A, 5B and 6, flange portions 40A and 40B are formed at the respective ends of a cylindrical measurement pipe 41 made, for example, of stainless steel. Insertion holes 42A and 42B are formed opposite each other in the center portion of the pipe shaft of the measurement pipe 41.

While predetermined gaps 44A and 44B are maintained relative to the insertion holes 42A and 42B, magnetic pole cores 43A and 43B, which have, for example, a cylindrical shape, are inserted into the insertion holes 42A and 42B and are securely welded to the outer ends of the insertion holes 42A and 42B.

The outer ends of the insertion holes 42A and 42B of the measurement pipe 41 into which the magnetic pole cores 43A and 43B are inserted are formed with tapered portions TA1 and TB1 that spread outwards. Likewise, for the magnetic pole cores 43A and 43B, tapered portions TA2 and TB2 that narrow inwardly are formed opposite the tapered portions TA1 and TB1. Then, for the insertion holes 42A and 42B, these tapered portions are employed as dovetailed grooves 45A and 45B whose cross sections extend outward, like a cone. In this manner, stoppers SP3A and SP3B are provided.

A lining member 46 made of a fluoroplastic is deposited by lining, on the inner wall of the measurement pipe 41, the distal ends of the magnetic pole cores 43A and 43B and inside the gaps 44A and 44B and the dovetailed grooves 45A and 45B.

In order to provide the lining member 46 inside the gaps 44A and 44B and the dovetailed grooves 45A and 45B, resin molding need only be performed by applying a fluoroplastic, together with the formation of the internal diameter.

Further, in a direction perpendicular to the center line that connects the centers of the magnetic pole cores 43A and 43B, insertion holes 47A and 47B used to insert detection electrodes (not shown) are formed through the lining member 46.

Further, cylindrical electrode attachment portions 48A and 48B for fixing the detection electrodes are welded to the outer wall in the center portion of the measurement pipe 41, perpendicular to the magnetic pole cores 43A and 43B.

Fourth Embodiment

Figure 7A:
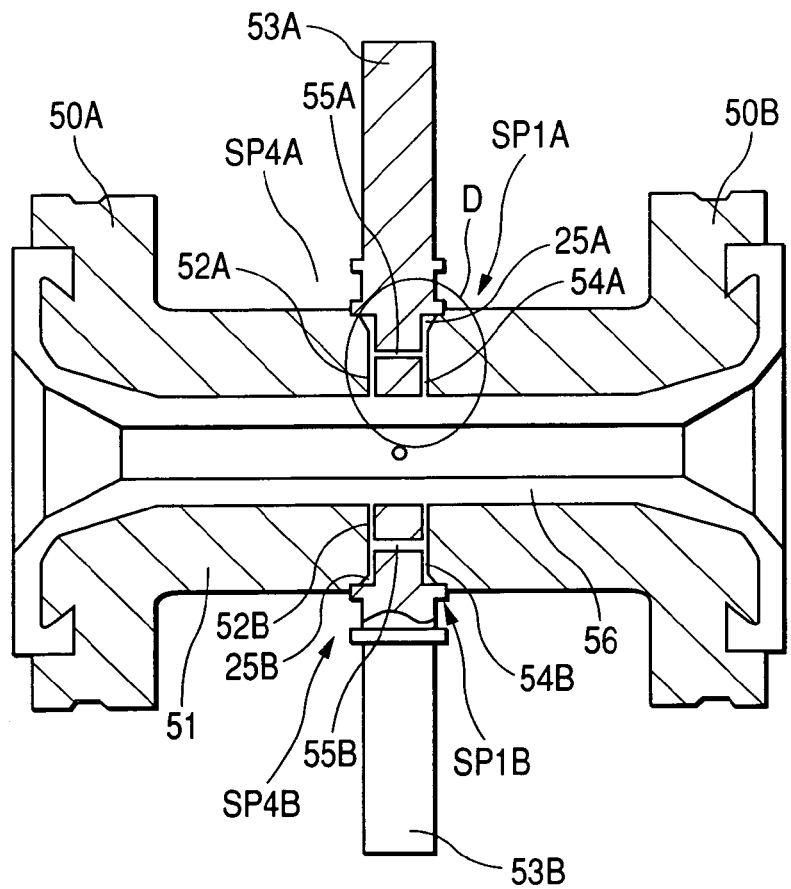
FIG. 7A is a vertical, cross-sectional view of the structure of the essential portion of a measurement pipe according to a fourth embodiment of the present invention.
Figure 7B:
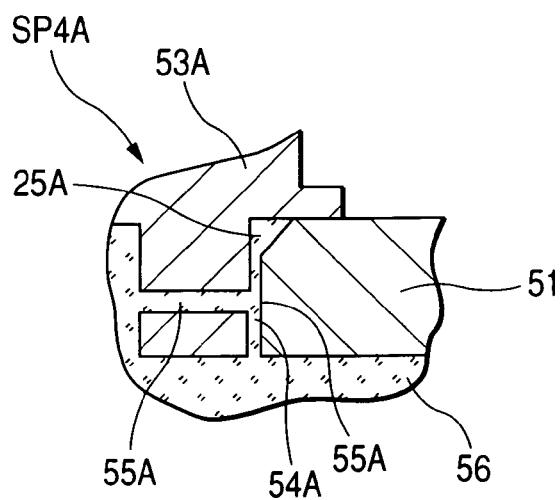
FIG. 7B is a detailed diagram showing a portion D in FIG. 7A.
Figure 8:
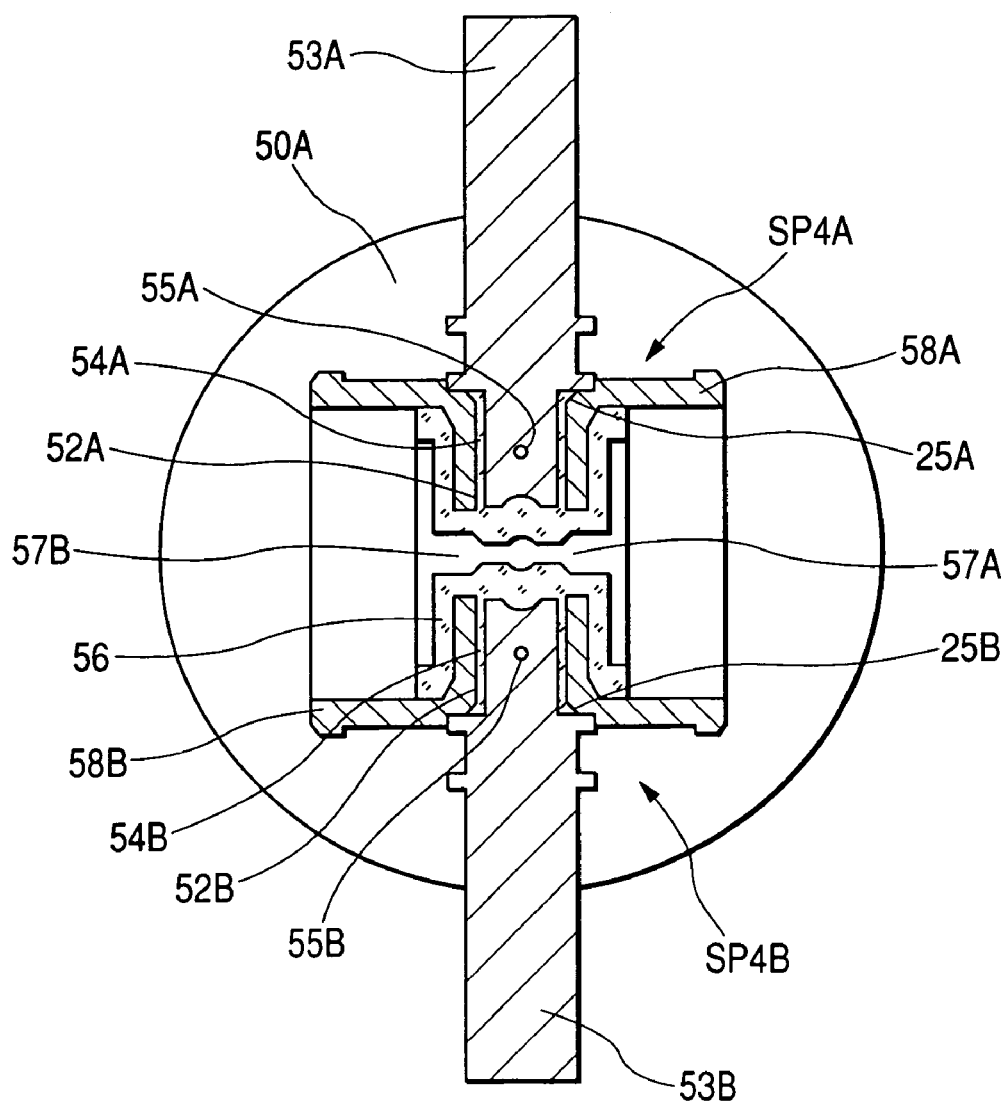
FIG. 8 is a transverse, cross-sectional view of the center portion of the measurement pipe shown in FIG. 7A.

FIG. 7A is a vertical cross-sectional view of the structure of the essential portion of a measurement pipe according to a fourth embodiment of the invention. FIG. 7B is a detailed diagram showing a portion D in FIG. 7A. FIG. 8 is a transverse, cross-sectional view of the center portion of the measurement pipe in FIGS. 7A and 7B.

In FIGS. 7A, 7B and 8, flange portions 50A and 50B are formed at the respective ends of a cylindrical measurement pipe 51 made, for example, of stainless steel. Insertion holes 52A and 52B are formed opposite each other in the center portion of the pipe shaft of the measurement pipe 51.

While predetermined gaps 54A and 54B are maintained relative to the insertion holes 52A and 52B, magnetic pole cores 53A and 53B, which have, for example, a cylindrical shape, are inserted into the insertion holes 52A and 52B and are securely welded to the outer ends of the insertion holes 52A and 52B.

The outer ends of the insertion holes 52A and 52B are tapered so that the insertion holes 52A and 52B spread outwards. Tapered portions 25A and 25B serve as first stoppers SP1A and SP1B, which lock a lining member as shown in FIGS. 1 and 2. Further, through holes 55A and 55B are formed in the side faces of the magnetic pole cores 53A and 53B that face the gaps 54A and 54B. Thus, these components constitute second stoppers SP4A and SP4B.

A lining member 56 made of a fluoroplastic is deposited by lining, on the inner wall of the measurement pipe 51, the distal ends of the magnetic pole cores 53A and 53B, inside the gaps 54A and 54B and the tapered portions 25A and 25B, and the through holes 55A and 55B.

In order to provide the lining member 56 inside, for example, the gaps 54A and 54B, the tapered portions 25A and 25B and the through holes 55A and 55B, resin molding need only be performed by applying a fluoroplastic, together with the formation of the internal diameter.

Further, in a direction perpendicular to the center line that connects the centers of the magnetic pole cores 53A and 53B, insertion holes 57A and 57B used to insert detection electrodes (not shown) are formed through the lining member 56.

Further, cylindrical electrode attachment portions 58A and 58B for fixing the detection electrodes are welded to the outer wall in the center portion of the measurement pipe 51, perpendicular to the magnetic pole cores 53A and 53B.

When the tapered portions 25A and 25B that serve as the stoppers SP1A to SP4B, the dovetailed grooves 35A and 35B, the dovetailed grooves 45A and 45B and the through holes 55A and 55B described above are appropriately employed, great effects for the locking of the lining member can be obtained by the interaction of these components.

Fifth Embodiment

Figure 9:
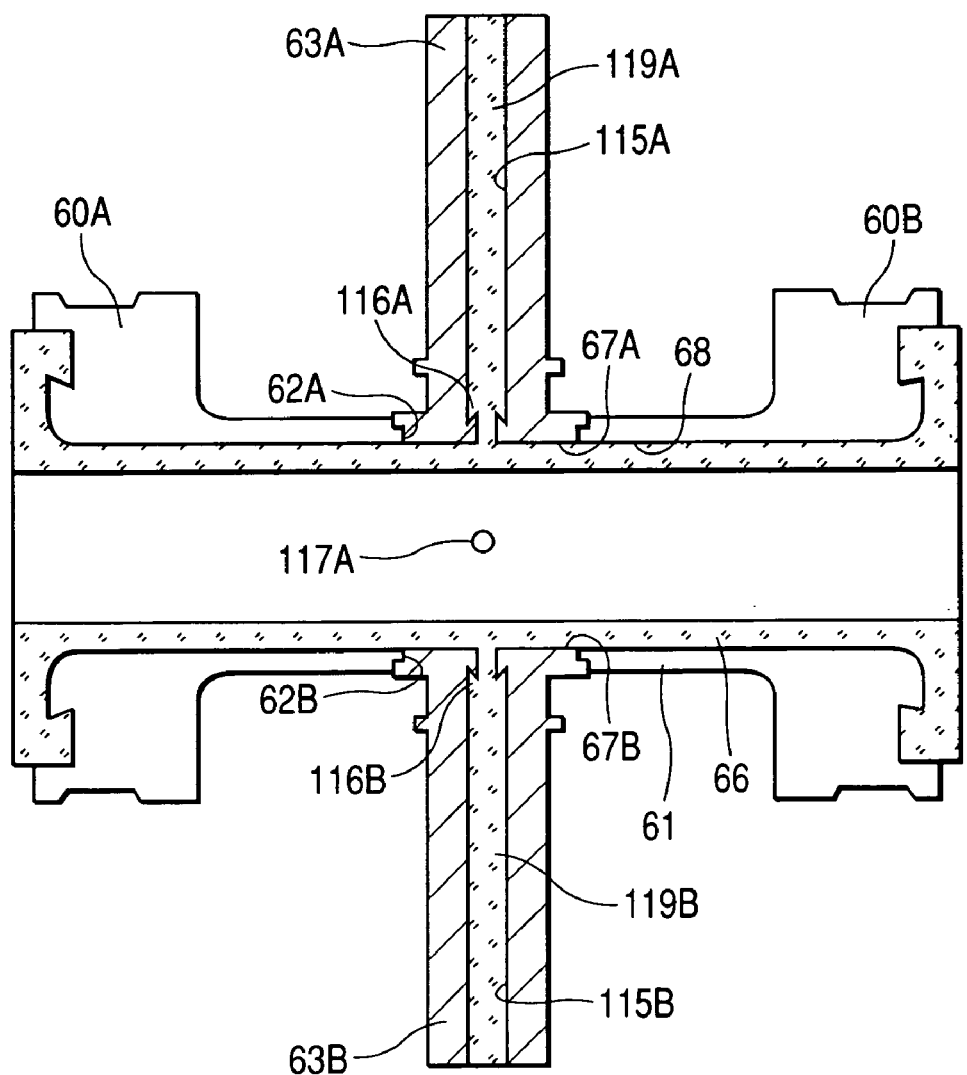
FIG. 9 is a diagram showing the structure of the essential portion of a measurement pipe according to a fifth embodiment of the invention.
Figure 10:
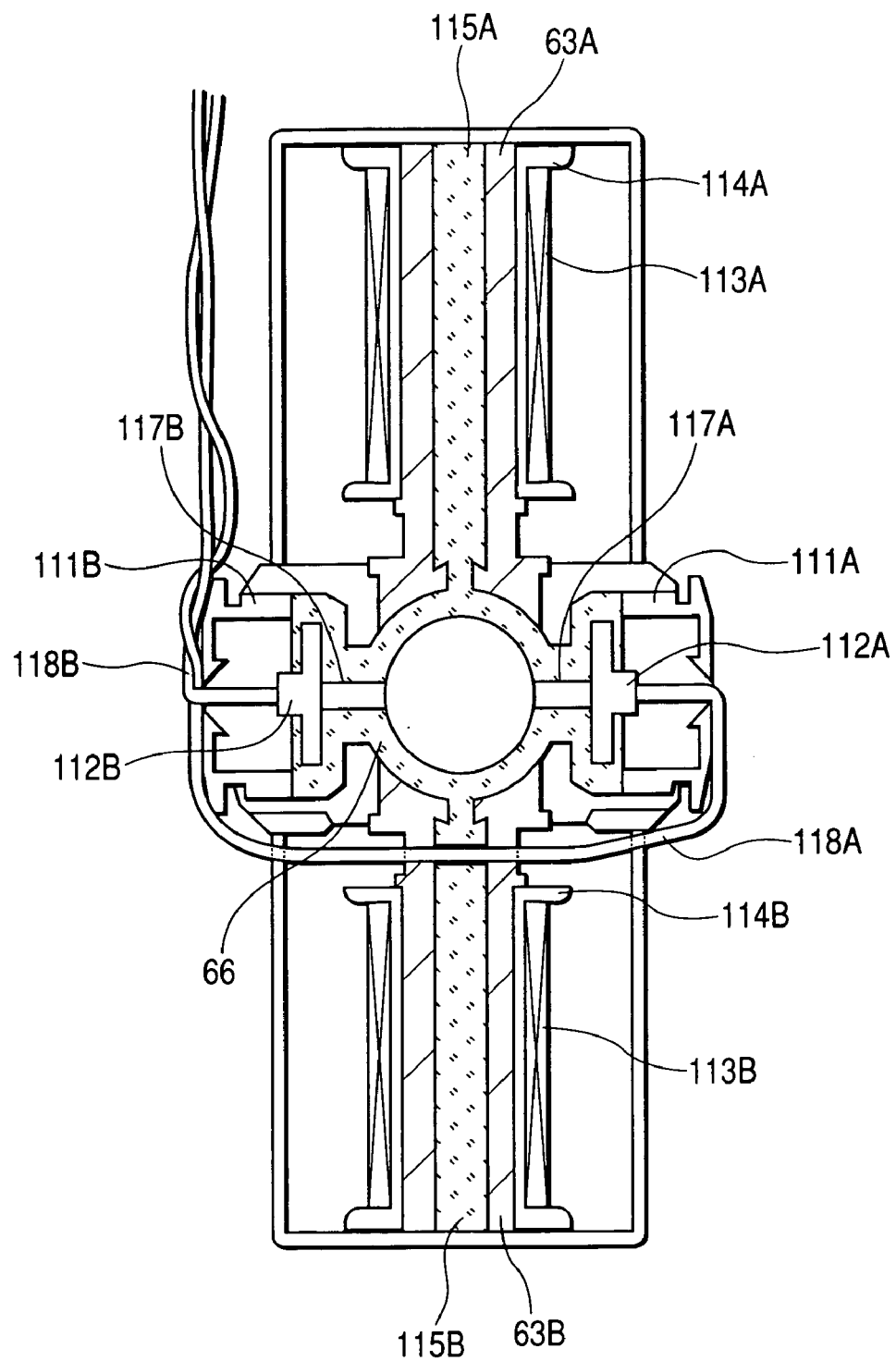
FIG. 10 is a transverse, cross-sectional view of the center portion of the measurement pipe shown in FIG. 9.

FIG. 9 is a diagram showing the structure of the essential portion of a measurement pipe according to a fifth embodiment of the invention. FIG. 10 is a transverse, cross-sectional view of the center portion of the measurement pipe in FIG. 9.

In FIGS. 9 and 10, flange portions 60A and 60B are formed at the respective ends of a cylindrical measurement pipe 61 made, for example, of stainless steel. Insertion holes 62A and 62B are formed opposite each other in the center portion of the pipe shaft of the measurement pipe 61.

Magnetic pole cores 63A and 63B, which have (for example) a cylindrical shape are inserted into the insertion holes 62A and 62B and are securely welded to the outer ends of the insertion holes 62A and 62B.

The magnetic pole cores 63A and 63B are held so that when they are inserted into the insertion holes 62A and 62B of the measurement pipe 61, distal ends 67A and 67B are located on the same plane as an inner wall face 68 of the measurement pipe 61. Coil bobbins 114A and 114B, around which coils 113A and 113B are wound, are fitted over the magnetic pole cores 63A and 63B.

Furthermore, through holes 115A and 115B are formed in the axial direction at the center positions of the magnetic pole cores 63A and 63B. Lining resins 119A and 119B, which are the same type as a lining member 66, are used to fill in the through holes 115A and 115B, and serve as a stopper for locking a lining member 66. In the through holes 115A and 115B, steps 116A and 116B are formed on the lining member 66 side. That is, the diameters of the through holes 115A and 115B near the lining member 66 are reduced, while the diameters on the other side are increased, so that the steps 116A and 116B are provided.

When the lining resins 119A and 119B are used to fill in the through holes 115A and 115B having the steps 116A and 116B, the lining resins 119A and 119B can be held at the positions of the steps 116A and 116B. Therefore, effective locking of the lining resins 119A and 119B can be obtained, and the affect on the measurement accuracy caused by changes in the fluid temperature can be reduced.

Further, since the through holes 115A and 115B are formed at the center positions in the magnetic pole cores 63A and 63B, the occurrence of eddy currents in the center of the magnetic pole cores 63A and 63B can be prevented, and the frequency property of the magnetic circuit can be improved.

As described above, since resin molding is performed with formation of the internal diameter of the measurement pipe 61, the lining member 66 that includes the stopper can be formed on the inner wall of the measurement pipe 61 and in the through holes 115A and 115B of the magnetic pole cores 63A and 63B.

Further, in the direction perpendicular to the center line that connects the centers of the magnetic pole cores 63A and 63B, electrode insertion holes 117A and 117B, into which detection electrodes (first and second electrodes 112A and 112B) are to be inserted, are formed through the lining member 66.

In addition, cylindrical electrode attachment portions 111A and 111B for fixing the first and the second electrodes 112A and 112B, are welded to the outer wall of the center portion of the measurement pipe 61, which is perpendicular to the magnetic pole cores 63A and 63B.

The first and the second electrodes 112A and 112B are arranged in the electrode attachment portions 111A and 111B, so that these electrodes are exposed through the lining member 66, facing the interior of the measurement pipe 61.

A first signal line 118A, extending from the first electrode 112A, is passed through the magnetic pole core 63B. The first signal line 118A and a second signal line 118B are twisted together on the second electrode 112B side.

Since the first and the second signal lines 118A and 118B are twisted together at the shortest distance possible, only the first signal line 118A is passed through the magnetic pole core 63B.

According to the above described structure, in order to obtain the shortest distance, only the first signal line 118A is passed through the magnetic pole core 631 and led to the second signal line 118B side. Thus, an eddy current generated in the magnetic pole core 63B is affected and differential noise tends to occur. However, since the hollow through hole 115B is formed in the magnetic pole core 63B, an eddy current does not occur in the center of the magnetic pole core 63B (or 63A), and accordingly, differential noise generated along the first signal line 118A is reduced.

Sixth Embodiment

Figure 11:
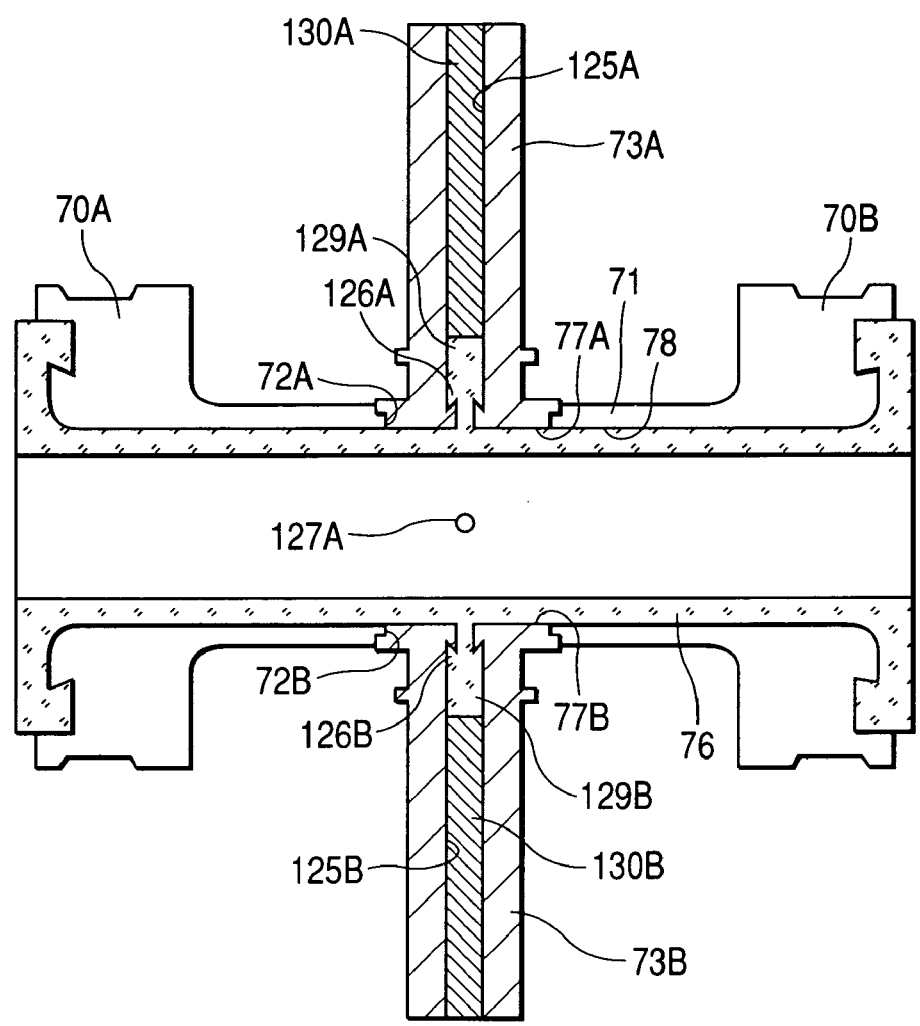
FIG. 11 is a diagram showing the structure of the essential portion of a measurement pipe according to a sixth embodiment of the invention.
Figure 12:
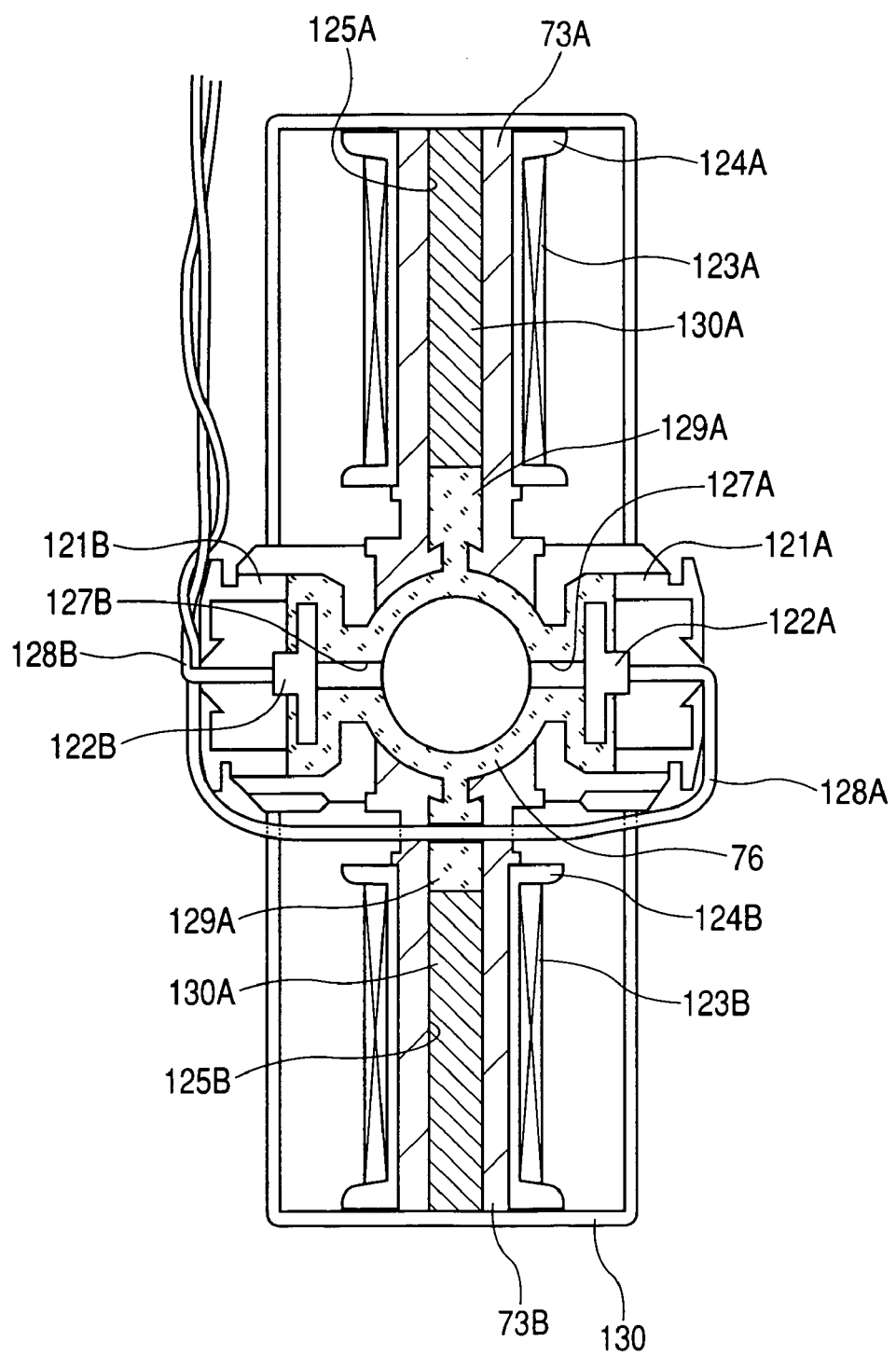
FIG. 12 is a transverse, cross-sectional view of the center portion of the measurement pipe shown in FIG. 11.
Figure 13:
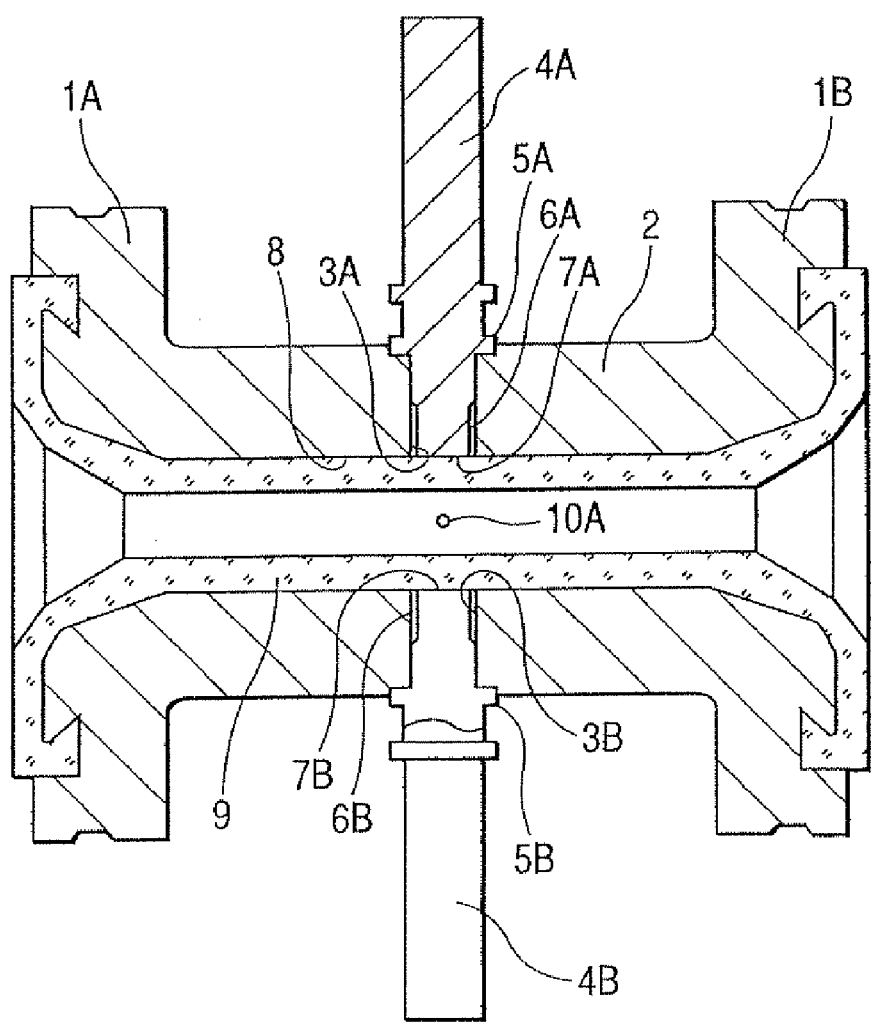
FIG. 13 is a vertical, cross-sectional view of the structure of the measurement pipe of a first related electromagnetic flowmeter that has a small diameter.
Figure 14:
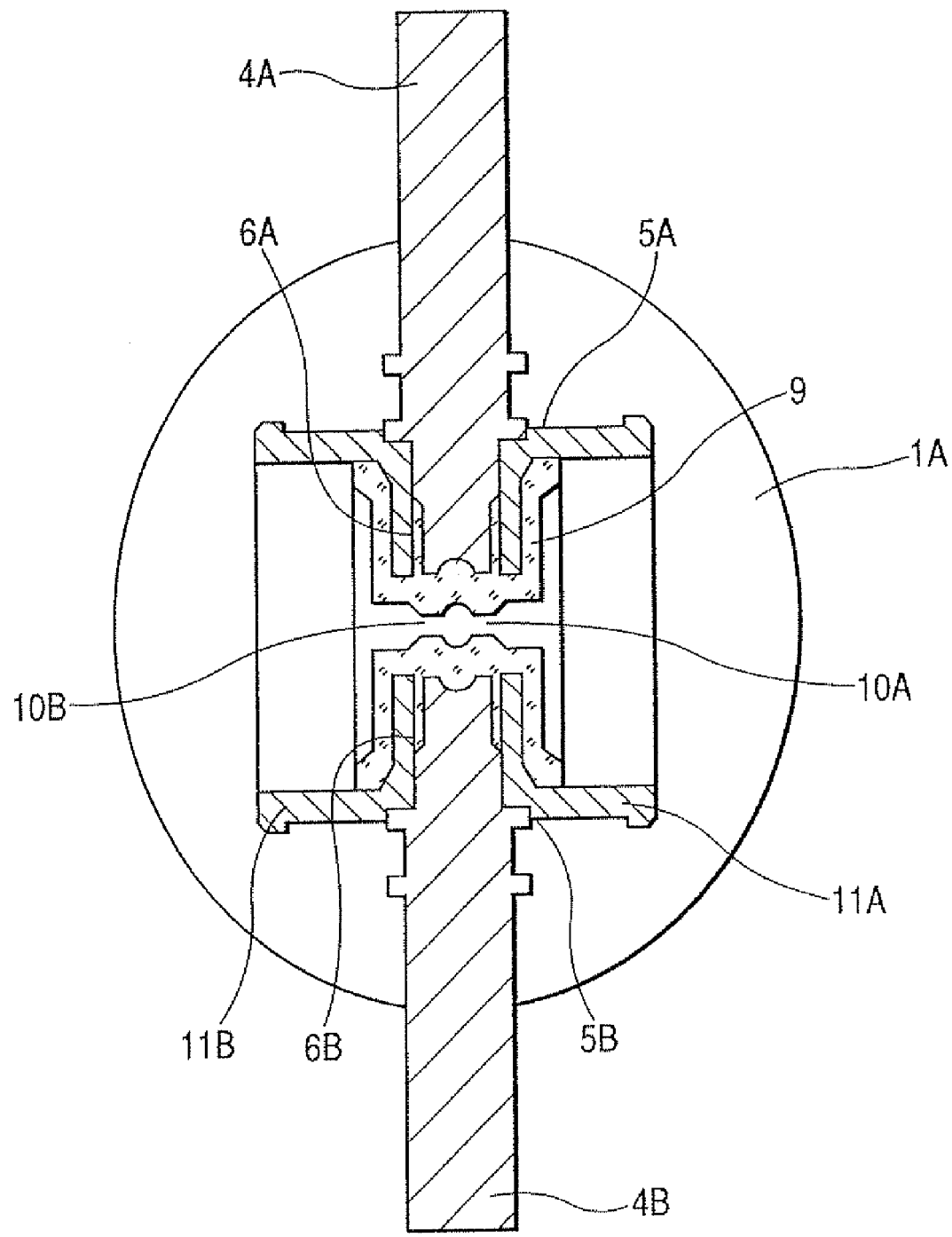
FIG. 14 is a transverse, cross-sectional view of the measurement pipe shown in FIG. 13.
Figure 15:
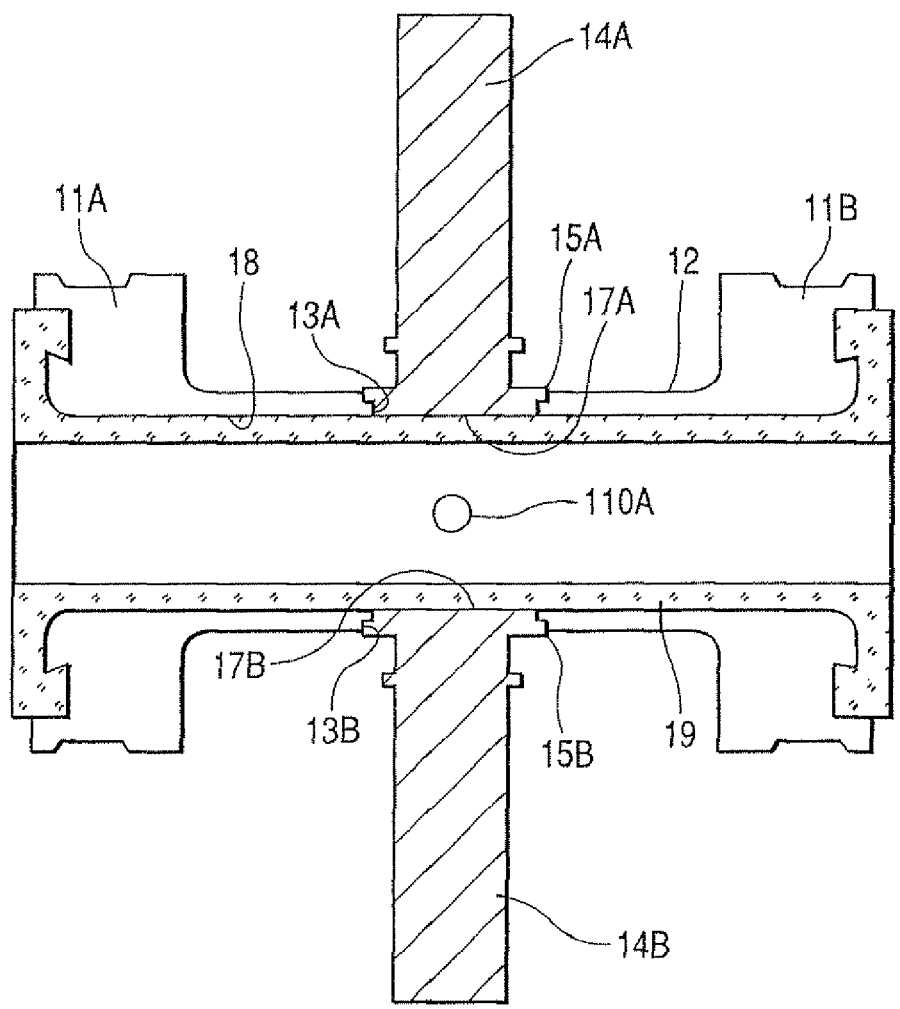
FIG. 15 is a vertical, cross-sectional view of the structure of the measurement pipe of a second related electromagnetic flowmeter that has a small diameter.
Figure 16:
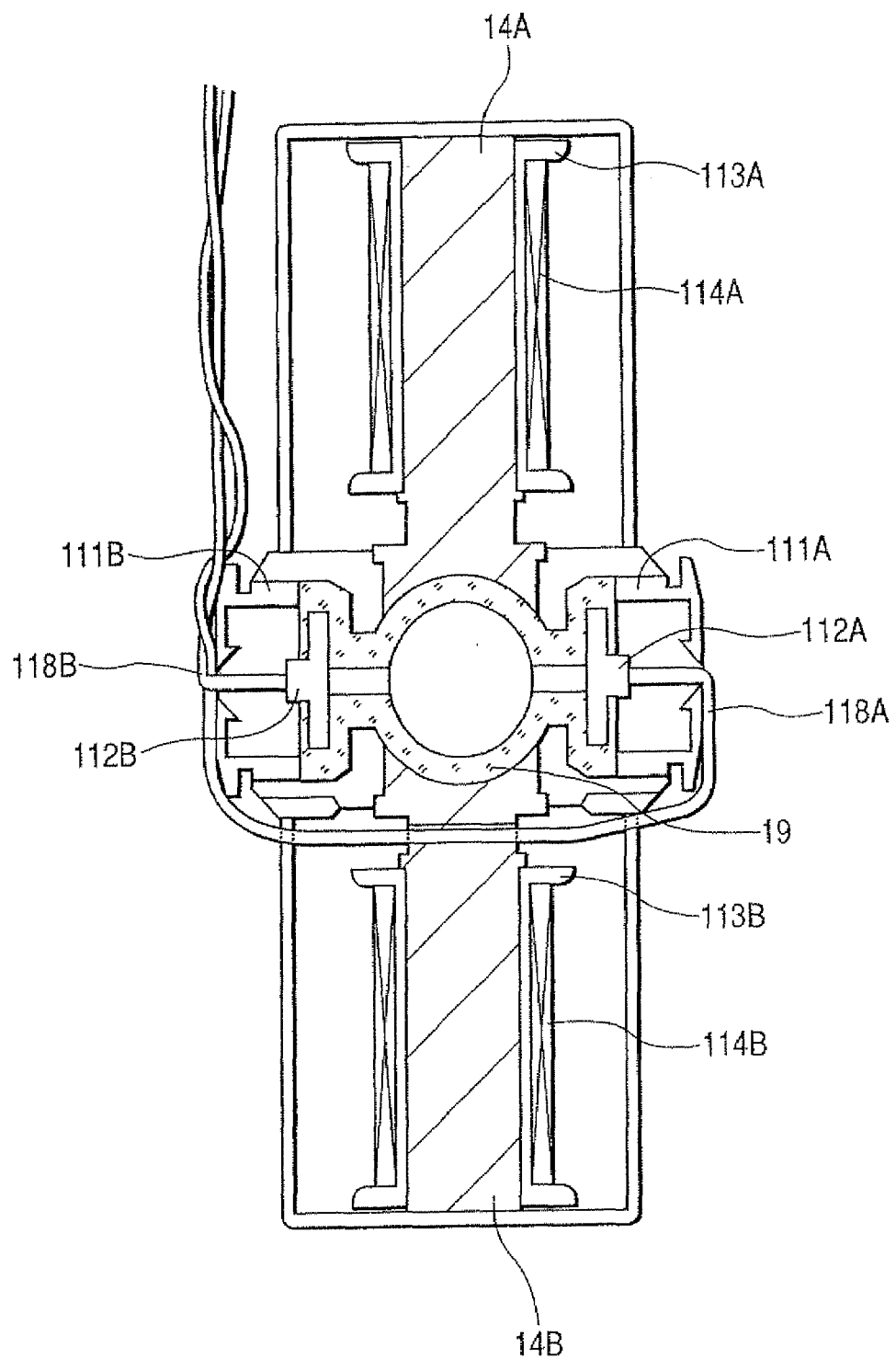
FIG. 16 is a transverse, cross-sectional view of the measurement pipe shown in FIG. 15.

FIG. 11 is a diagram showing the structure of the essential portion of a measurement pipe according to a sixth embodiment of the invention. FIG. 12 is a transverse, cross-sectional view of the center portion of the measurement pipe in FIG. 11.

In FIGS. 11 and 12, flange portions 70A and 70B are formed at the respective ends of a cylindrical measurement pipe 71 made, for example, of stainless steel Insertion holes 72A and 72B are formed opposite each other in the center portion of the pipe shaft of the measurement pipe 71.

Magnetic pole cores 73A and 73B, which have, for example, a cylindrical shape, are inserted into the insertion holes 72A and 72B and are securely welded to the outer ends of the insertion holes 72A and 72B.

The magnetic pole cores 73A and 73B are held so that when they are inserted into the insertion holes 72A and 72B of the measurement pipe 71, distal ends 77A and 77B are located on the same plane as an inner wall face 78 of the measurement pipe 71. Coil bobbins 124A and 124B around which coils 123A and 123B are wound, are fitted over the magnetic pole cores 73A and 73B.

At the center positions in the magnetic pole cores 73A and 73B, through holes 125A and 125B are formed in the axial direction. For the through holes 125A and 125B, lining resins 129A and 129B are used to partially fill them near the lining member 76. Soft magnetic metal powder resin mixtures 130A and 130B, such as insulating silicon resins or epoxy resins into which soft magnetic metal powder has been mixed are used to fill in the remaining portions. Since a mixture that includes soft magnetic metal powder is used, the magnetic flux densities of the magnetic pole cores 73A and 73B can be increased. Eddy currents occur in the soft magnetic metal resin mixtures 130A and 130B; however, the magnitudes of the eddy currents generated in the individual mixtures are small, and since the soft magnetic metal is surrounded by insulating resin, the eddy currents converge quickly and have very little affect.

Furthermore, the soft magnetic metal powder resin mixtures 130A and 130B may not only be used to fill in part of the through holes, but since they provide adhesion effects, they may also be employed for the fixing of a sheet core 131.

In the through holes 125A and 125B, steps 126A and 126B are formed near the lining member 76. That is, the diameters of the through holes 125A and 125B near the lining member 76 are reduced, and the diameters on the other side are increased, so that the steps 126A and 126B are provided.

When the lining resins 129A and 129B are used to fill in the through holes 125A and 125B up to the positions of the steps 126A and 126B from the lining member 76 side, the lining resins 129A and 129B can be held at the positions of the steps 126A and 126B. Therefore, effective locking of the lining resins 129A and 129B can be obtained, and the affect on the measurement accuracy caused by changes in the fluid temperature can be reduced.

Further, since the through holes 125A and 125B are formed at the center positions in the magnetic pole cores 73A and 73B, the occurrence of eddy currents in the center of the magnetic pole cores 73A and 73B can be prevented, and the frequency property of the magnetic circuit can be improved.

As described above, when a fluoroplastic is deposited by lining, on the inner wall of the measurement pipe 71 and in part of the through holes 125A and 125B of the magnetic pole cores 73A and 73B, the thus deposited lining member 76 can be held by the lining resins 129A and 129B that are used to fill in the through holes 125A and 125B.

Further, in the direction perpendicular to the center line that connects the centers of the magnetic pole cores 73A and 73B, electrode insertion holes 127A and 127B, into which detection electrodes (first and second electrodes 122A and 122B) are to be inserted, are formed through the lining member 76.

In addition, cylindrical electrode attachment portions 121A and 121B for fixing the first and the second electrodes 122A and 122B are welded to the outer wall of the center portion of the measurement pipe 71, which is perpendicular to the magnetic pole cores 73A and 73B.

The first and the second electrodes 122A and 122B are arranged in the electrode attachment portions 121A and 121B so that these electrodes are exposed through the lining member 76, facing the interior of the measurement pipe 71.

A first signal line 128A, extending from the first electrode 122A, is passed through the magnetic pole core 73B. The first signal line 128A and a second signal line 128B are twisted together on the second electrode 122B side.

Since the first and the second signal lines 128A and 128B are twisted together at the shortest distance possible, only the first signal line 128A is passed through the magnetic pole core 73B.

According to the above described structure, in order to obtain the shortest distance, only the first signal line 128A is passed through the magnetic pole core 73B and led to the second signal line 128B side. Thus, an eddy current generated in the magnetic pole core 73B is affected and differential noise tends to occur. However, since the hollow through hole 125B is formed in the magnetic pole core 73B, an eddy current does not occur in the center of the magnetic pole core 73B. Accordingly, differential noise generated along the first signal line 128A is reduced.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An electromagnetic flowmeter comprising:
   a measurement pipe to which a magnetic pole core is fixed;
   a lining member for covering an inner wall surface of the measurement pipe; and
   a locking portion for locking the lining member, the locking portion being formed by providing a through-hole inside the magnetic pole core along an axis of the magnetic pole core so that the through-hole connects with the lining member, and filling the through-hole with a lining resin of a same type as that of the lining member.

2. The electromagnetic flowmeter according to claim 1, wherein the locking portion includes a step that is formed in the through-hole.

3. The electromagnetic flowmeter according to claim 2, wherein the step in the through-hole is formed so that a diameter of one end portion of the through-hole on the lining member side is smaller than that of the other part of the through-hole.

4. The electromagnetic flowmeter according to claim 2, wherein the through-hole is filled with the lining resin at least to a position where the step is formed.

* * * * *